May 15, 1934.    M. WEICHERT    1,958,875

METHOD AND DEVICE FOR TRANSPLANTING ROWS OF PLANTS

Filed Sept. 18, 1931

INVENTOR:
Max Weichert
By Eyre Scott & Keel
attys.

Patented May 15, 1934

1,958,875

UNITED STATES PATENT OFFICE 1,958,875

METHOD AND DEVICE FOR TRANSPLANTING ROWS OF PLANTS

Max Weichert, Neubrandenburg, Germany

Application September 18, 1931, Serial No. 563,545. In Germany September 24, 1930

11 Claims. (Cl. 55—18)

The present invention relates to a method and device for transplanting rows of plants.

It has been proposed already to displace the rows laterally, to deposit them in a deeper furrow and to bank them up with the soil of the adjacent furrow without rolling them. This involves a displacement of the various furrows to the extent of their mutual distance, which means that the entire soil down to the bottom of the furrow has to be moved at a great expenditure of force without exchanging the ground in the neighborhood of the plants. This manner of plant transfer is, however, out of the question if the distance between the rows of plants amounts to approximately 30 centimeters and more as has lately been found to be advantageous.

It has further been proposed to hollow out the strips of plants on both sides and to press them into the furrow produced without any lateral displacement.

It has been found, however, that the conditions of growth for the plants will become more favorable if in the non-shifted soil the rows of plants are slightly laterally displaced and lowered, that is, brought into a new environment, set into a deeper furrow and rolled there. The method according to the invention, which is preferably carried out by mechanical means, consists therefore in producing by the machine employing a diskwheel or the like, only on one side of the plant rows, a furrow of sufficient depth into which a narrow strip of ground carrying the plant row is forced by a subsequent tool acting on the other side of the plant row in a cutting and preferably simultaneously in a pressing manner, so that the plants in one operation may not only be planted deeper but displaced laterally and rolled in in their new position while a rearwardly disposed covering tool banks up the displaced plants with the earth previously dug out of the furrow.

The machine used for carrying out the process, which is preferably equipped so as to take care at the same time of several adjacent plant rows, is provided for each row with a round, slightly curved cutter disc capable of opening up a furrow which is approximately 10 centimeters deep and 5 centimeters wide and by means of which the row of plants is hollowed out. Closely behind this cutter is found a conical cutter disc roller which serves for cutting off a narrow strip of soil carrying the plants, forcing it into the lateral furrow and fixing it there in position by pressing. The further equipment includes also a banking disc.

Figure 3:
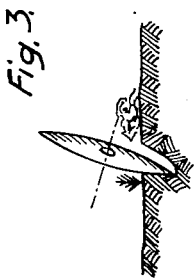
Figure 4:
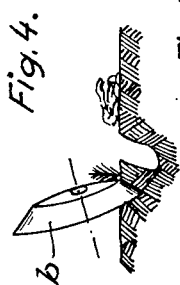
Figure 5:
Figure 6:
Figure 1:
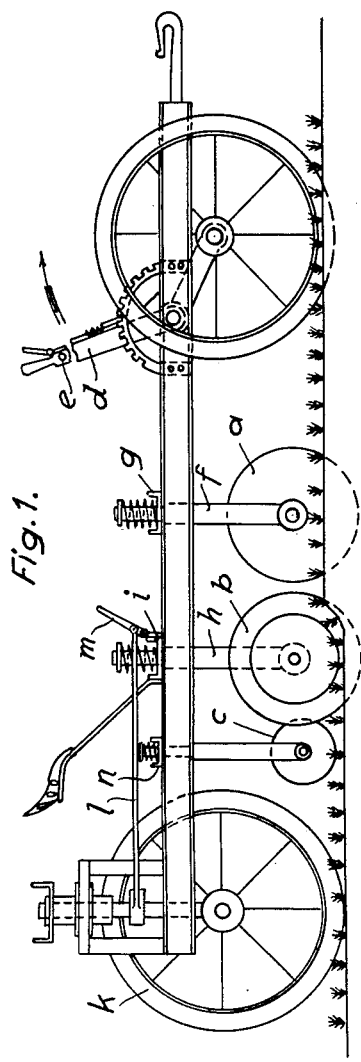
Figure 2:
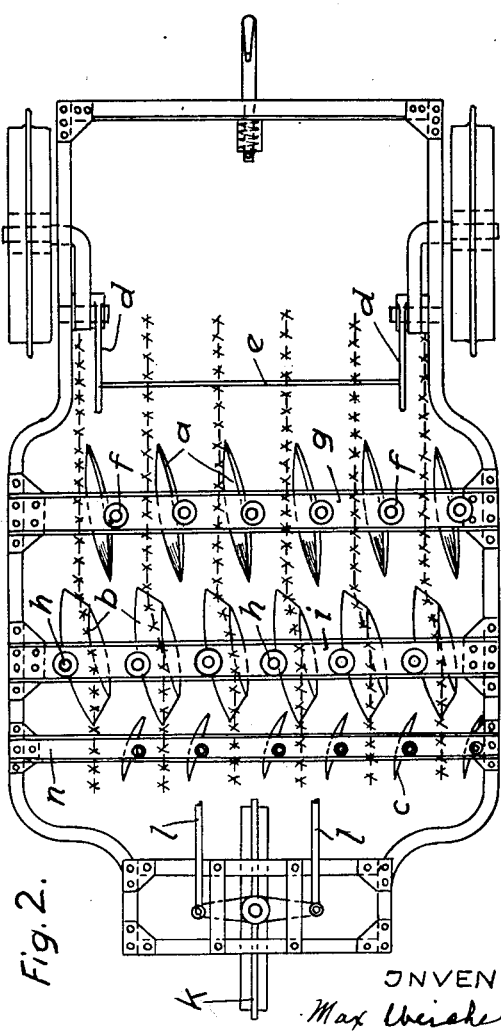

The drawing illustrates one form of the machine and the various operations. Figure 1 is a side view of the machine; Fig. 2, a plan thereof, Fig. 3 shows the step of digging the lateral furrow as seen from the rear end of the machine; Fig. 4 shows the steps of cutting off and forcing the narrow strip of earth sideways as seen from the front end of the machine; Fig. 5 shows the step of banking up as seen from the rear end of the machine; and Fig. 6 shows the transplanted and banked up row of plants.

The machine is constructed for working six rows of plants and comprises therefore six sets of the necessary tools arranged side by side. Each set consists of a rotary digging disc or ridger $a$, a cutter disc roller $b$ arranged closely behind it and having a conical shape and a banking disc $c$ behind the cutter disc roller $b$. The discs $a$ and $c$ work on one side of the row and the roller $b$ on the other. As the drawing shows, the axes of the discs $a$ and $b$ are inclined relative to both the direction of travel and the horizontal whereby the digging and displacing effect is produced while it suffices for the banking disc $c$ to have its axis positioned obliquely to the direction of travel.

The various units of the machine are carried by a frame on three wheels, which can be raised or lowered by means of the two adjusting levers $d$ and the connecting rod $e$ serving as handle in order to render the machine operative or inoperative. The holding members $f$ of the discs $a$ are elastically arranged on a front transverse member $g$; the holding members $h$ for the discs $b$ on a central transverse member $i$; and the holding members of the banking discs $c$ on a rear transverse piece $n$ of the machine frame.

The rear wheel $k$ in the center of the frame serves for steering and turning the machine and is disposed in a vertical shaft connected by the two rods $l$ with the foot rests $m$ for the driver who can thus steer with his feet and keep his hands free for handling the horses or operating the machine. The wheel $k$ must of course be so arranged relatively to the shifting discs $b$ as to clear the shifted plants.

I claim:—

1. A transplanting method for plants arranged in widely spaced rows, which consists in producing a furrow of sufficient depth on one side of the row of plants in the non-shifted soil and relatively close to said row of plants, forcing a narrow strip of soil carrying the row of plants laterally into the furrow and fixing it therein by pressure, and banking up the plants at their new lower location.

2. A transplanting method for plants arranged in rows, which consists in producing a furrow of sufficient depth on one side of the row of plants and relatively close to it, forcing a narrow strip of soil carrying the row of plants laterally into the furrow and fixing it therein by pressure, and banking up the plants at their new lower location with the ground previously dug out.

3. A method for the lateral displacement and deeper setting of plants arranged in widely spaced rows consisting in producing a furrow on one side of the row of plants in the non-shifted soil, subjecting the strip of earth carrying the plants to a pushing and, simultaneously, pressing action from the other side of the row of plants whereby the strip, under lateral displacement, is forced into the furrow and rolled therein, and banking up the plants at their new location.

4. A method for the transplanting of plants arranged in widely spaced rows, according to which a narrow strip of earth carrying the row of plants is exposed on one side of the row by digging a furrow of corresponding width and sufficient depth in the non-displaced soil, the strip of earth is further laterally and downwardly displaced by being moved into the furrow and pressed therein, and the transplanted row is banked up.

5. A method according to claim 4, according to which the strip of earth is moved down into the lateral furrow and pressed therein by one and the same member.

6. A method of the kind described, according to which the strip of ground carrying the row of plants is hollowed out on one side by the production of the furrow.

7. A machine for transplanting plants arranged in widely spaced rows, comprising a frame carrying for each row of plants a device for making a furrow acting on one side of the row in the non-shifted soil, means working on the other side of the same row of plants for forcing the said row into the furrow arranged behind the said device, means for rolling and banking up the said row after transplanting.

8. A transplanting machine for plants arranged in rows, comprising a frame, the said frame carrying for each rows of plants a ridger acting only on one side of the row of plants, behind the ridger a rotary cutter disc offset as to the row of plants and working on the other side of the row, behind the disc a banking device, and including means for rolling the transplanted row.

9. A machine for the lateral displacement and deeper setting of plants arranged in rows, comprising a frame, the said frame carrying a set of working tools for each row of plants, some of these sets consisting of a disc wheel acting on one side of the row of plants and adapted to produce a furrow close to the row of plants, a rotary body with conical circumferential surface adapted to press the row of plants into the furrow, the said rotary body being disposed behind the said disc wheel and offset for the width of the row of plants, and a rotary banking disc.

10. A machine according to claim 9, in which the disc wheel and the rotary body are inclined relative to the direction of travel and the ground.

11. The method of transplanting plants arranged in a row which consists in producing a furrow on one side of the row of plants and relatively close to it, forcing a narrow strip of soil carrying the row of plants laterally into the furrow thus produced, and then fixing said row of plants therein by pressure, and banking up the plants at their new lower location in the furrow.

MAX WEICHERT.